United States Patent
Bae

(10) Patent No.: US 8,233,917 B2
(45) Date of Patent: Jul. 31, 2012

(54) METHOD OF PROVIDING LOCATION SERVICES IN WIMAX NETWORK IRRESPECTIVE OF STATE OF MOBILE STATION

(75) Inventor: Chul Min Bae, Seoul (KR)

(73) Assignee: LG-Ericsson Co., Ltd., Seoul (KR)

( * ) Notice: Subject to any disclaimer, the term of this patent is extended or adjusted under 35 U.S.C. 154(b) by 1003 days.

(21) Appl. No.: 11/954,705

(22) Filed: Dec. 12, 2007

(65) Prior Publication Data

US 2008/0146261 A1 Jun. 19, 2008

(30) Foreign Application Priority Data

Dec. 13, 2006 (KR) .................. 10-2006-0127387
Nov. 9, 2007 (KR) .................. 10-2007-0114549

(51) Int. Cl.
*H04W 24/00* (2009.01)
*H04W 68/00* (2009.01)
(52) U.S. Cl. ............. 455/456.3; 455/456.1; 455/456.2; 455/458
(58) Field of Classification Search ........ 455/456.3–458
See application file for complete search history.

(56) References Cited

U.S. PATENT DOCUMENTS

| 7,254,405 | B2 * | 8/2007 | Lin et al. .................... 455/456.1 |
| 7,729,705 | B2 * | 6/2010 | Jung et al. .................. 455/456.1 |
| 2004/0160909 | A1 * | 8/2004 | Sheynblat .................... 370/328 |
| 2005/0148340 | A1 * | 7/2005 | Guyot ........................ 455/456.2 |
| 2006/0003775 | A1 * | 1/2006 | Bull et al. .................. 455/456.1 |
| 2006/0099960 | A1 * | 5/2006 | Duan ......................... 455/456.2 |
| 2006/0099972 | A1 * | 5/2006 | Nair et al. ................... 455/458 |
| 2007/0105567 | A1 * | 5/2007 | Mohanty et al. ............. 455/458 |
| 2008/0171559 | A1 * | 7/2008 | Frank et al. ................ 455/456.5 |

FOREIGN PATENT DOCUMENTS

| WO | WO 01/52569 A1 | 7/2001 |
| WO | WO 2005/029902 A1 | 3/2005 |

OTHER PUBLICATIONS

Chou, Joey et al; "Location Based Services"; IEEE 802.16 Broadband Wireless Access Working Group; Sep. 25, 2006 (XP-00247936).
European Search Report dated May 27, 2008.

* cited by examiner

*Primary Examiner* — Patrick Edouard
*Assistant Examiner* — Huy C Ho
(74) *Attorney, Agent, or Firm* — KED & Associates LLP

(57) ABSTRACT

A method of providing locations services of a mobile station in a worldwide interoperability for microwave access (WiMAX) network including an access service network (ASN) is provided. For executing a paging and location update (PLU), a serving base station transmits a scanning interval allocation response message (MOB-SCN-RSP) defined in the WiMAX wireless standard to a target mobile station, which transmits a scanning result report message (MOB-SCN-REP) defined in the standard to the serving base station in response to the MOB-SCN-RSP. The serving base station generates a location measurement result based on the MOB-SCN-REP and transmits to the ASN gateway. The ASN gateway forms a location response based on the location measurement result and transmits the location response to an LCS server. The LCS server creates a location service response of the target mobile station based on the location response and transmits the location service response to the LCS client.

15 Claims, 3 Drawing Sheets

METHOD OF PROVIDING LOCATION SERVICES IN WIMAX NETWORK IRRESPECTIVE OF STATE OF MOBILE STATION

The present application claims priority from Korean Patent Application Nos. 10-2006-127387 (filed on Dec. 13, 2006) and 10-2007-114549 (filed on Nov. 9, 2007), the entire subject matters of which are incorporated herein by reference.

BACKGROUND OF THE INVENTION

1. Field of the Invention

The present invention relates to a method of providing location services in a mobile communication network, and more particularly to a method of providing location services by using messages defined in the institute of electrical and electronic engineers (IEEE) 802.16 standard without any change irrespective of the state of a mobile station in a worldwide interoperability for microwave access (WiMAX) network.

2. Background of the Invention

The 802.16 WiMAX technology is a next-generation wireless broadband communication technology providing wide-area outdoor services with more extended functions and coverage than Wi-Fi, which is a wireless communication technology providing indoor services around a hot spot. While the coverage of Wi-Fi (802.11b/g) is about 30 to 200 m and the transmission rate thereof is no more than 4 to 11 Mbps, the coverage of WiMAX can be extended up to 10 km and its available transmission rate is 40 Mbps, which offers a substantial technical advantage.

With the development of mobile communication systems and the increase in subscribers, locations services have been provided, which inform the geographical location of a mobile communication terminal. The location services can be useful when there is a need for emergency calls, tracking illegal users or logistics management.

No method has been presented, which provides location services in a WiMAX network proposed as a next-generation wireless broadband communication technology. Accordingly, there is a need for an efficient method of providing location services.

Further, in a wireless broadband internet (WiBro) network similar to the WiMAX network, there have been attempts to provide location services by using a complicated procedure, including adding a media access control (C) message to messages defined in the WiMAX wireless standard (IEEE 802.16 standard).

Moreover, there is a problem in that when a mobile station is in an idle state, it is difficult to track the location of the mobile station.

SUMMARY OF THE INVENTION

Thus, the object of the present invention is to provide a method of providing location services by using messages defined in the WiMAX wireless standard (IEEE 802.16 standard) without any change in a WiMAX network irrespective of the state of a mobile station.

In accordance with one aspect of the present invention, there is provided a method of providing location services of a mobile station in a worldwide interoperability for microwave access (WiMAX) network including an access service network (ASN), including: at a location service (LCS) server, receiving a location service request of a target mobile station from an LCS client; at the LCS server, making a request for the location of the target mobile station to an ASN gateway that provides a service to the target mobile station; at the ASN gateway, determining whether or not to execute a paging and location update (PLU) of the target mobile station; if the execution of the PLU is determined, executing the PLU at each of the ASN gateway, a serving base station and the target mobile station; if the execution of the PLU is not determined or when the execution of the PLU is completed, making a request for the location measurement of the target mobile station to the serving base station at the ASN gateway; at the serving base station, sending a scanning interval allocation response message (MOB-SCN-RSP) defined in the WiMAX wireless standard to the target mobile station; at the target mobile station, sending a scanning result report message (MOB-SCN-REP) defined in the WiMAX wireless standard to the serving base station in response to the scanning interval allocation response message (MOB-SCN-RSP); at the serving base station, generating a location measurement result based on the scanning result report message (MOB-SCN-REP) and transmitting the location measurement result to the ASN gateway; at the ASN gateway, creating a location response based on the location measurement result and transmitting the location response to the LCS server; and at the LCS server, creating a location service response of the target mobile station based on the location response and transmitting the location service response to the LCS client.

In accordance with another aspect of the present invention, there is provided a storage medium that stores computer-readable instructions for executing a method of providing location services of a mobile station in a worldwide interoperability for microwave access (WiMAX) network including an access service network (ASN), the method including: at a location service (LCS) server, receiving a location service request of a target mobile station from an LCS client; at the LCS server, making a request for the location of the target mobile station to an ASN gateway that provides a service to the target mobile station; at the ASN gateway, determining whether or not to execute a paging and location update (PLU) of the target mobile station; if the execution of the PLU is determined, executing the PLU at each of the ASN gateway, a serving base station and the target mobile station; if the execution of the PLU is not determined or when the execution of the PLU is completed, making a request for the location measurement of the target mobile station to the serving base station at the ASN gateway; at the serving base station, sending a scanning interval allocation response message (MOB-SCN-RSP) defined in the WiMAX wireless standard to the target mobile station; at the target mobile station, sending a scanning result report message (MOB-SCN-REP) defined in the WiMAX wireless standard to the serving base station in response to the scanning interval allocation response message (MOB-SCN-RSP); at the serving base station, generating a location measurement result based on the scanning result report message (MOB-SCN-REP) and transmitting the location measurement result to the ASN gateway; at the ASN gateway, creating a location response based on the location measurement result and transmitting the location response to the LCS server; and at the LCS server, creating a location service response of the target mobile station based on the location response and transmitting the location service response to the LCS client.

DETAILED DESCRIPTION OF THE INVENTION

Hereinafter, a method of providing location services in a WiMAX network in accordance with an embodiment of the present invention will be described with reference to the accompanying drawings.

Figure 1:
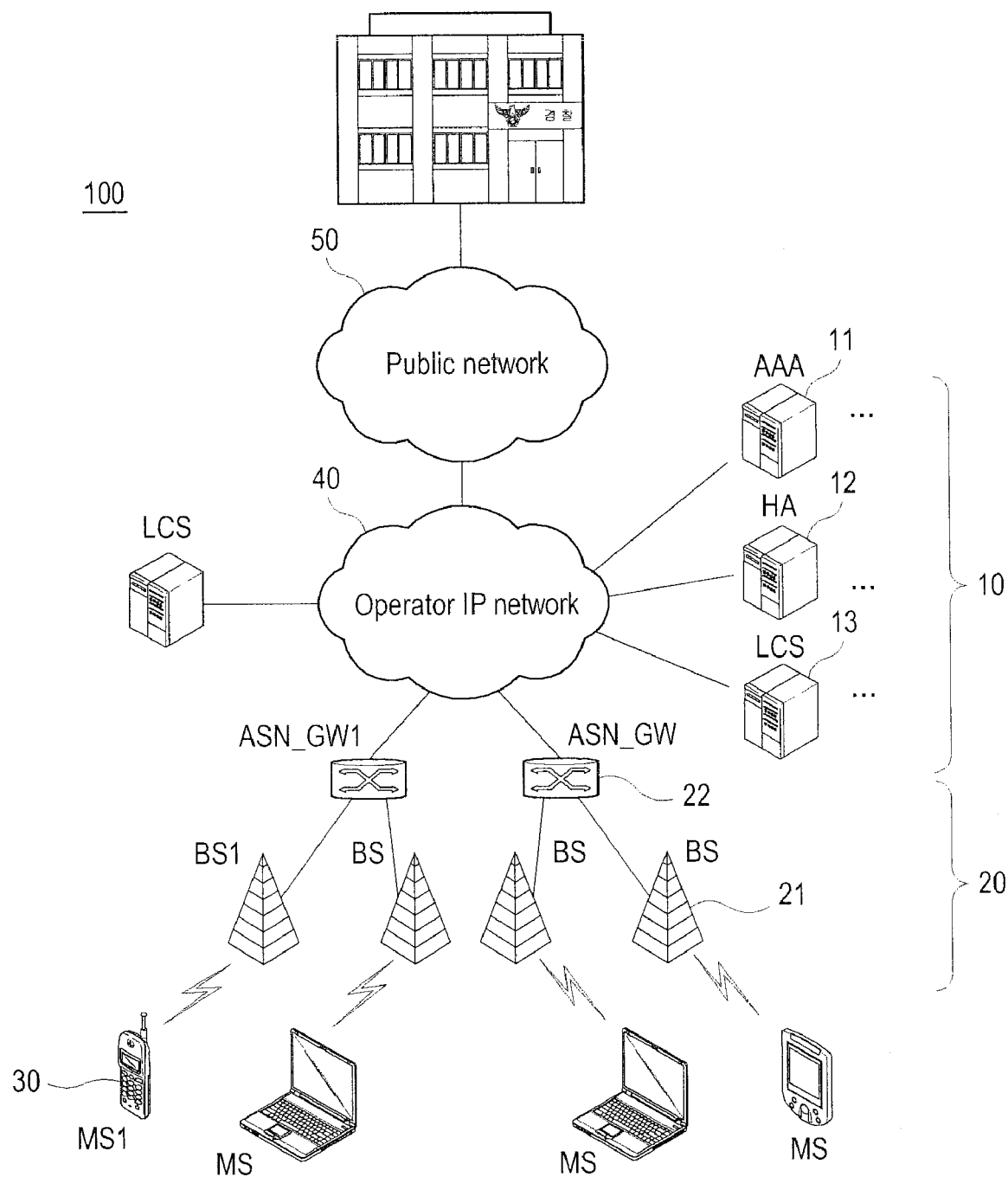
FIG. 1 shows the structure of a WiMAX network in accordance with an embodiment of the present invention.

FIG. 1 shows a schematic structure of a WiMAX network 100, to which a location set-vice method in accordance with an embodiment of the present invention is applied.

A connectivity service network (CSN) 10 is a set of networks for providing connectivity of application services, such as Internet and voice over Internet protocol (VoIP), the home agent (HA) of a mobile IP, authentication and charging functions, and location services to a subscriber of a broadband wireless access service provided by an operator. The CSN 10 includes an authentication, authorization and accounting (AAA) server 11, a HA server 12, a location service (LCS) server 13, etc. Specifically, the LCS server 13 serves as a positioning server (PS) that processes a location service request from an LCS client and calculates the position of a mobile station (MS).

An access service network (ASN) 20 is a set of networks for providing a subscriber with broadband wireless access. The ASN 20 includes a plurality of base stations (BSs) 21 and ASN gateways (ASN_GWs) 22, and supports the functions such as connection setup between the BSs 21 and MSs 30, network detection, network selection, radio resource management, etc. Each of the BSs 21 performs the basic functions of the BSs, including connecting the MSs 30 and the ASN_GWs 22 and converting a signal format to adapt the signal to wireless and wired links, and comprises an LCS module. The ASN_GWs 22 perform the functions of session mobility management and ASN radio resource management. The BSs 21 and the ASN_GWs 22 may be physically configured as one unit or as two independent units, and may be seen as one unit logically.

In the embodiment of the present invention, each base station 21 performs the function of a paging agent for broadcasting a paging message. Further, each ASN_GW 22 performs the function of a paging controller for controlling at least one paging agent.

Figure 2:
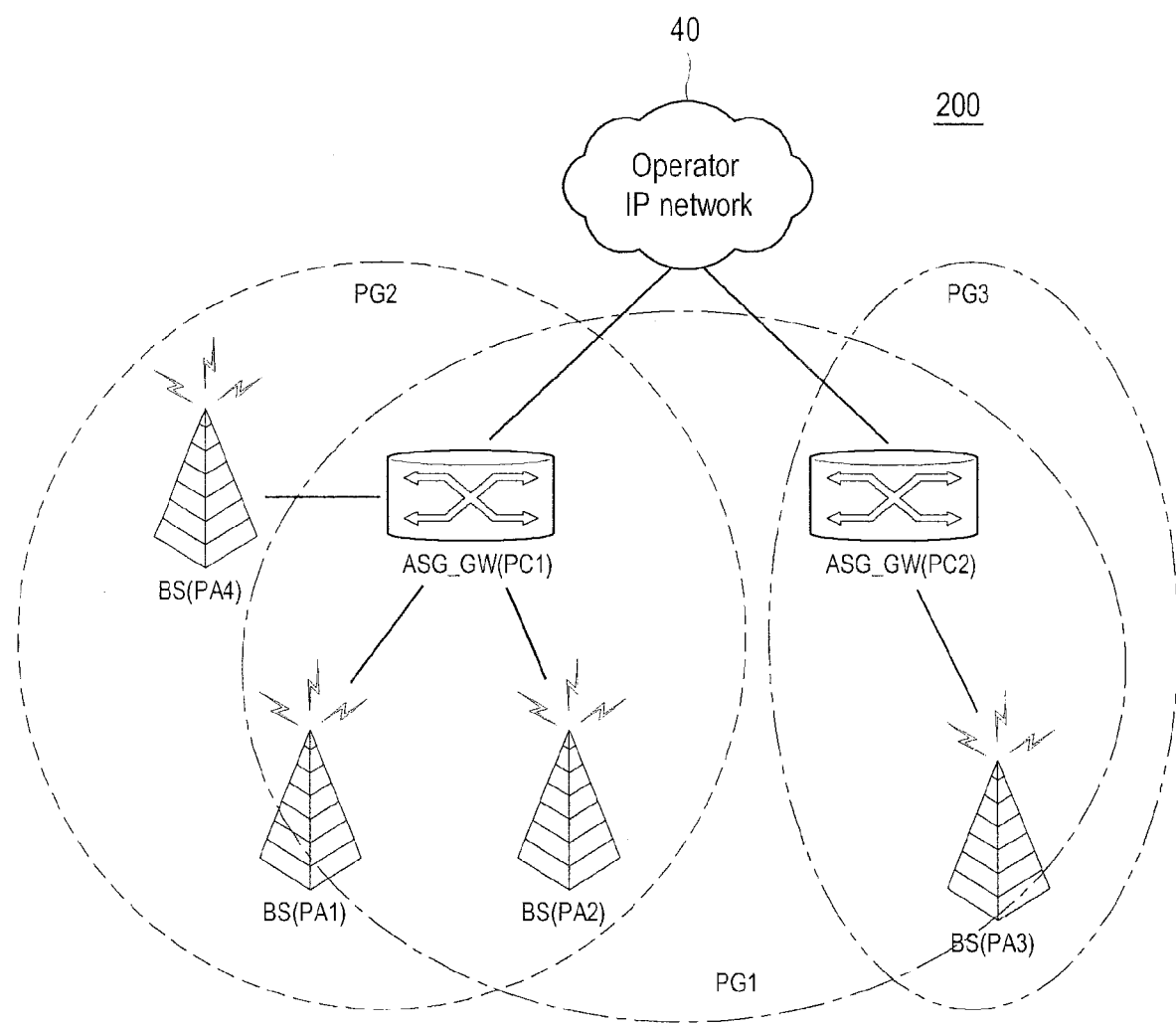
FIG. 2 shows the structure of a paging network in accordance with an embodiment of the present invention.

FIG. 2 shows a schematic structure of a paging network 200 including a plurality of paging agents PA1, PA2, PA3, and PA4 and paging controllers PC1 and PC2. In the paging network 200, paging groups PGs each including at least one paging controller PC and at least one paging agent PA are established. For example, as shown in FIG. 2, in the paging network 200, a first paging group PG1 including the paging controllers PC1 and PC2 and the paging agents PA1, PA2, and PA3, a second paging group PG2 including the paging controller PC1 and the paging agents PA1, PA2, and PA4, and a third paging group PG3 including the paging controller PC2 and the paging agent PA3 may be established.

Figure 3:
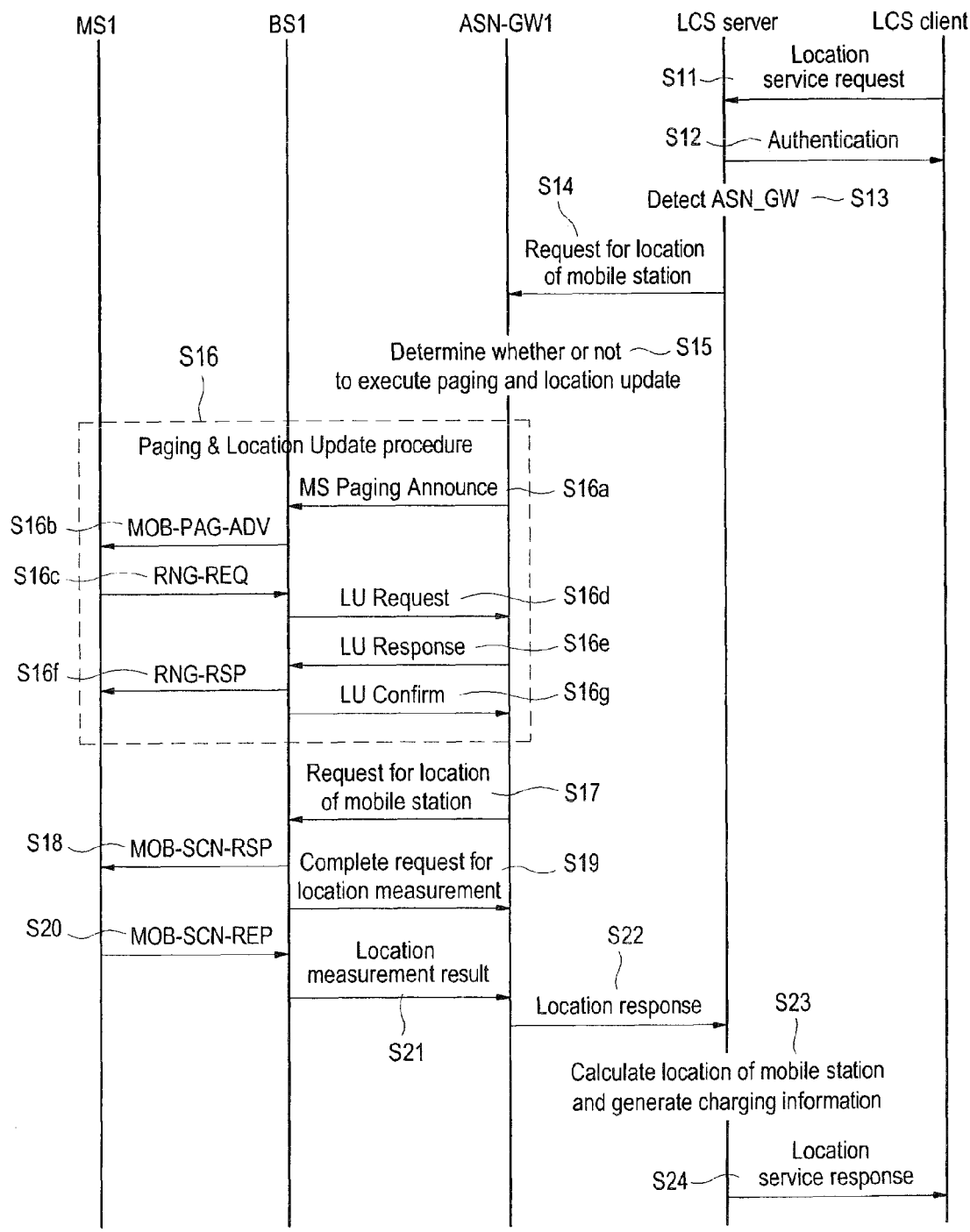
FIG. 3 shows a call flow and a method of providing location services in accordance with an embodiment of the present invention.

FIG. 3 shows a call flow and a method of providing location services in accordance with an embodiment of the present invention.

When a location service request of an MS 30 is received from an LCS client (S11), the LCS server authenticates the LCS client (S12) and finds out which ASN_GW 22 provides a wireless service to a target MS1 (S13). Next, the LCS server makes a request for the location of the target MS1 to an ASN_GW1 providing a wireless service to the target MS1 (S14).

When the request for the location of the target MS1 is received, the ASN_GW1 determines whether or not to execute the paging and location update (PLU) of the target MS1 (S15). In other words, if the target MS1 is in an idle state, then the ASN_GW1 determines to execute the PLU of the target MS1 (S16).

If the execution of the PLU is determined (S16), then the ASN_GW1 serving as a paging controller sends an MS paging announce message for the target MS1 to all the BSs serving as paging agents in the paging group(s) it belongs (S16a). When the paging announce message is received, the serving BS1 sends a paging message (MOB_PAG_ADV) to the target MS1 (S16b). The target MS1 that has received the MOB_PAG_ADV message transmits a ranging request (RNG-REQ) message to the serving BS1 to request for location update (S16c). Then, the serving BS1 sends a location update request (LU request) message of the target MS1 to the ASN-GW1 (S16d). When the LU request message is received, the ASN_GW1 sends an LU response message to the serving BS1 (S16e). Upon receiving the LU response message, the serving BS1 sends a ranging response (RNG-RSP) message to the target MS1 in order to notify that the location update has been executed (S16f). It also sends an LY confirmation message to the ASN_GW1 in order to notify that the location update has been executed (S16g).

If the target MS1 is not in the idle state or when the execution of the above-mentioned PLU is completed (S16), then the ANS_GW1 makes a request for the location measurement of the target MS1 to the serving BS1 (S17). Then, the serving BS1 sends a Scanning interval allocation response (MOB_SCN_RSP) message defined in the WiMAX wireless standard (IEEE 802.16 standard) to the target MS1 (S18). It also reports the completion of the location measurement request to the ASN_GW1 (S19). In response to the MOB_SCN_RSP message, the target MS1 sends a scanning result report (MOB_SCN_REP) message defined in the WiMAX wireless standard (IEEE 802.16 standard) to the serving BS1 (S20). The scanning result includes at least one of BS carrier to interface and noise ratio (CINR), BS receive signal strength indicator (RSSI), relative delay, and BS round trip delay (RTD).

The serving BS1 creates a location measurement result based on the MOB_SCN_REP message and transmits the location measurement result to the ASN_GWL (S21). Then, the ASN_GW1 transmits a location response to the LCS server (S22). Further, the LCS server performs the calculation of the location of the MS1 and the generation of charging information (S23). At this time, the LCS server obtains the location and speed of the MS1 based on the location information of the serving BS1 and the BS CINR, BS RSSI, relative delay, and BS RTD measured by the target MS1 from the location measurement result received from the ASN_GW1. The location of the MS1 is expressed in terms of latitude, longitude and altitude.

Next, the LCS server transmits a location service response containing location information and charging information of the MS1 (S24) to the LCS client.

In another embodiment of the present invention, a storage medium is provided in order to store computer-readable instructions for executing the embodiment set forth above.

According to the embodiment of the present invention it is possible to provide a WiMAX location service without changing the structure of a mobile station used in an existing WiMAX network. This is accomplished by providing a WiMAX location service irrespective of the state of the mobile station by using messages defined in the existing WiMAX wireless standard (IEEE 802.16 standard) without any change.

Although embodiments have been described with reference to a number of illustrative embodiments thereof, it should be understood that numerous other modifications and embodiments can be devised by those skilled in the art that will fall within the spirit and scope of the principles of this disclosure.

What is claimed is:

1. A method of providing location services of a mobile station in a worldwide interoperability for microwave access (WiMAX) network including one or more access service networks (ASNs), comprising:
   at a location service (LCS) server, receiving a location service request of a target mobile station included in a first paging group from an LCS client;
   at the LCS server, making a request for a location of the target mobile station to an ASN gateway that provides a service to the target mobile station;
   at the ASN gateway, determining whether or not to execute a paging and location update (PLU) of the target mobile station;
   if the execution of the PLU is determined to be executed, then executing the PLU at each of the ASN gateway, a serving base station and the target mobile station;
   if the execution of the PLU is not determined to be executed or when the execution of the PLU is completed, making a request for a location measurement of the target mobile station to the serving base station at the ASN gateway;
   at the serving base station, sending a scanning interval allocation response message (MOB-SCN-RSP) defined in the WiMAX wireless standard to the target mobile station;
   at the target mobile station, sending a scanning result report message (MOB-SCN-REP) defined in the WiMAX wireless standard to the serving base station in response to the scanning interval allocation response message (MOB-SCN-RSP);
   at the serving base station, generating a location measurement result based on the scanning result report message (MOB-SCN-REP) and transmitting the location measurement result to the ASN gateway;
   at the ASN gateway creating a location response based on the location measurement result and transmitting the location response to the LCS server; and
   at the LCS server, creating a location service response of the target mobile station based on the location response and transmitting the location service response to the LCS client,
   wherein the scanning interval allocation response message defined in the WiMAX wireless standard is transmitted to the target mobile station, the scanning result report message defined in the WiMAX wireless standard is sent to the serving base station in response to the scanning interval allocation response message, the location measurement result is generated based on the scanning result report message and transmitted to the ASN Gateway, and the location response is created based on the location measurement result and transmitted to the LCS server irrespective of whether the target mobile station is in idle mode or not, and
   wherein the location service request is initiated and transmitted to the LCS server when the target mobile station remains within the first paging group.

2. The method of claim 1, wherein determining whether or not to execute a paging and location update (PLU) comprises:
   analyzing status information of the target mobile station; and
   if the target mobile station is in an idle state as a result of said analysis, determining whether to execute the PLU.

3. The method of claim 1, wherein, after receiving the location service request, the method further comprises:
   at the LCS server, authenticating the LCS client;
   at the LCS server, detecting an ASN gateway providing a wireless service to the target mobile station; and
   at the LCS server, making a request for the location of the target mobile station to the ASN gateway.

4. The method of claim 1, wherein the location service response transmitted to the LCS client from the LCS server contains a location and a speed of the target mobile station calculated from the location information of the serving base station and the location measurement result that are received by the LCS server from the serving base station via the ASN gateway.

5. The method of claim 4, wherein executing the PLU comprises:
   at the ASN gateway, sending a paging announce message (MS Paging Announce) for the target mobile station;
   at the serving base station, sending a paging message (MOB_PAG_ADV) to the target mobile station upon receiving the paging announce message;
   when the paging message (MOB_PAG_ADV) is received, at the target mobile station, transmitting a ranging request message (RNG-REQ) to the serving has station to request for location update;
   when the location update request (LU request) is received, at the serving base station, sending a location update request message of the target mobile station to the ASN gateway;
   when the location update request message (LU request) is received, at the ASN gateway, sending a response message (LU response) to the serving base station; and
   when the response message (LU response) is received, at the serving base station, sending a ranging response message (RNG_RSP) to the target mobile station and sending a location update confirmation message (LU confirm) to the ASN gateway to notify that the location update for the target mobile station has been executed.

6. The method of claim 5, wherein the WiMAX wireless standard is an IEEE 802.16 standard.

7. A non-transitory storage medium that stores computer-readable instructions for executing a method of providing location services of a mobile station in a worldwide interoperability for microwave access (WiMAX) network including one or more access service networks (ASNs), the method comprising:
   at a location service (LCS) server, receiving a location service request of a target mobile station included in a first paging group from an LCS client;
   at the LCS server, making a request for the location of the target mobile station to an ASN gateway that provides a service to the target mobile station;
   at an ASN gateway, determining whether or not to execute a paging and location update (PLU) of the target mobile station;
   if the execution of the PLU is determined to be performed, then executing the PLU at each of the ASN gateway, a serving base station and the target mobile station;
   if the execution of the PLU is not determined to be performed or when the execution of the PLU is completed, making a request for the location measurement of the target mobile station to the serving base station at the ASN gateway;

at the serving base station sending a scanning interval allocation response message (MOB-SCN-RSP) defined in the WiMAX wireless standard to the target mobile station;

at the target mobile station, sending a scanning result report message (MOB-SCN-REP) defined in the WiMAX wireless standard to the serving base station in response to the scanning interval allocation response message (MOB-SCN-RSP);

at the serving base station, generating a location measurement result based on the scanning result report message (MOB-SCN-REP) and transmitting the location measurement result to the ASN gateway;

at the ASN gateway, creating a location response based on the location measurement result and transmitting the location response to the LCS server; and at the LCS server, creating a location service response of the target mobile station based on the location response and transmitting the location service response to the LCS client, wherein the scanning interval allocation response message defined in the WiMAX wireless standard is transmitted to the target mobile station, the scanning result report message defined in the WiMAX wireless standard is sent to the serving base station in response to the scanning interval allocation response message, the location measurement result is generated based on the scanning result report message and transmitted to the ASN Gateway, and the location response is created based on the location measurement result and transmitted to the LCS server irrespective of whether the target mobile station is in idle mode or not, and wherein the location service request is initiated and transmitted to the LCS server when the target mobile station remains within the first paging group.

8. The non-transitory storage medium of claim 7, wherein determining whether or not to execute a paging and location update (PLU), comprises:

analyzing status information of the target mobile station; and if the target mobile station is in an idle state as a result of said analysis, determining whether to execute the PLU.

9. The non-transitory storage medium of claim 7, wherein, after receiving a location service request, the method comprises:

at the LCS server, authenticating the LCS client;

at the LCS server, detecting an ASN gateway providing a wireless service to the target mobile station; and at the LCS server, making a request for a location of the target mobile station to the ASN gateway.

10. The non-transitory storage medium of claim 7, wherein the location service response transmitted to the LCS client from the LCS server contains a location and a speed of the target mobile station calculated from the location info nation of the serving base station and the location measurement result that are received by the LCS server from the serving base station via the ASN gateway.

11. The non-transitory storage medium of claim 7, wherein executing the PLU comprises:

at the ASN gateway, sending a paging announce message (MS Paging Announce) for the target mobile station;

at the serving base station, sending a paging message (MOB_PAG_ADV) to the target mobile station upon receiving the paging announce message;

when the paging message (MOB_PAG_ADV) is received, at the target mobile station, transmitting a ranging request message (RNG-REQ) to the serving has station to request for location update;

when the location update request is received, at the serving base station, sending a location update request message (LU request) of the target mobile station to the ASN gateway;

when the location update request message (LU request) is received, at the ASN gateway, sending a response message (LU response) to the serving base station; and when the response message (LU response) is received, at the serving base station, sending a ranging response message (RNG_RSP) to the target mobile station, and sending a location update confirmation message (LU confirm) to the ASN gateway to notify that the location update for the target mobile station has been executed.

12. The method of claim 1, further comprising:

at the LCS server, generating charging information based on the location measurement result; and transmitting the charging information to the LCS client.

13. The method of claim 1, wherein a location of the target mobile station determined based on the location measurement result includes a latitude, longitude, and altitude of the target mobile terminal.

14. The non-transitory storage medium of claim 7, further comprising:

at the LCS server, generating charging information based on the location measurement result; and transmitting the charging information to the LCS client.

15. The non-transitory storage medium of claim 7, wherein a location of the target mobile station determined based on the location measurement result includes a latitude, longitude, and altitude of the target mobile terminal.

* * * * *